Nov. 28, 1967  E. C. HOBAICA  3,355,227

FABRICATION OF LARGE FLAT BEARINGS

Filed Jan. 25, 1965

INVENTOR.
EDWARD C. HOBAICA

BY his ATTORNEYS

United States Patent Office

3,355,227
Patented Nov. 28, 1967

3,355,227
FABRICATION OF LARGE FLAT BEARINGS
Edward C. Hobaica, Mystic, Conn., assignor to General Dynamics Corporation, New York, N.Y., a corporation of Delaware
Filed Jan. 25, 1965, Ser. No. 427,701
2 Claims. (Cl. 308—5)

This invention relates to flat bearings and, more particularly, to a new and improved grooved flat bearing having a large bearing surface area which may be fabricated conveniently and inexpensively.

Heretofore, flat bearings have generally been made in a single piece having a continuous surface and, where large area bearing surfaces are required, it has been difficult and expensive to produce the necessary large homogenous flat bearings in one piece. Moreover, as the bearing surface area increases, the likelihood of introduction of foreign matter which could damage the bearing surfaces during operation increases and the opportunity for such matter to be eliminated by motion of the bearing surfaces is reduced.

Accordingly, it is an object of the present invention to provide a new and improved flat bearing which overcomes the above-mentioned difficulties of the prior art.

Another object of the invention is to provide a large flat bearing which is inexpensive and easy to fabricate.

A further object of the invention is to provide a new and improved large flat bearing which facilitates elimination of foreign matter from the bearing surface.

These and other objects of the invention are accomplished by joining a plurality of mating flat bearing segments together so that the bearing surfaces of all of the segments are in coplanar relation. In the preferred embodiment, each bearing segment has an anti-friction layer comprising a fabric having fibers made of polytetrafluoroethylene, such as the commercial material known as "Teflon," and the segments are shaped along their adjacent sides to provide channels along the surface through which a lubricant under pressure may be applied so as to flood the surface of the bearing. These channels also constitute a trap for foreign matter which may accumulate between the flat bearing surface and a cooperating bearing surface during operation.

Figure 1:
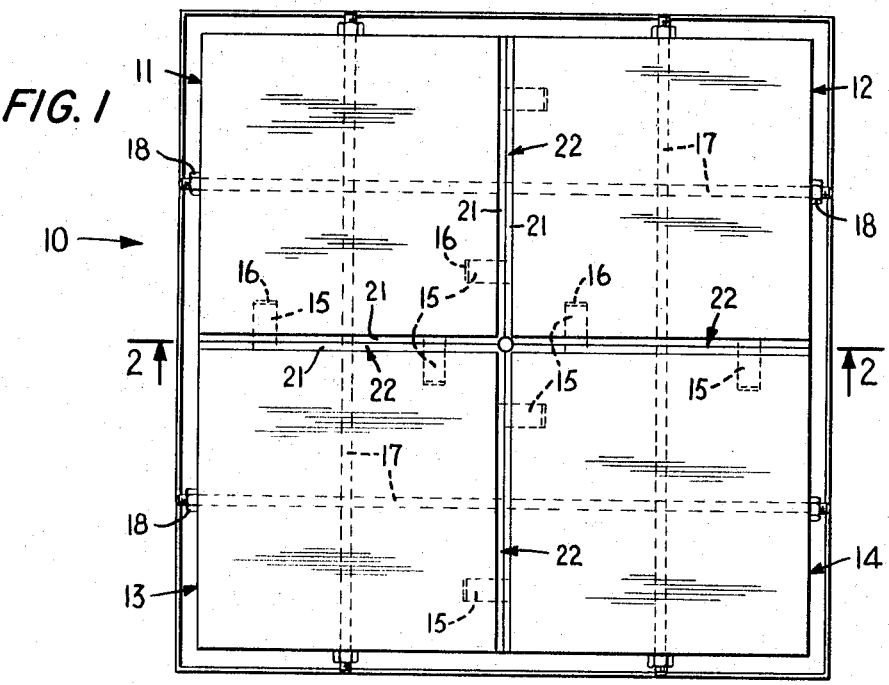
Figure 2:
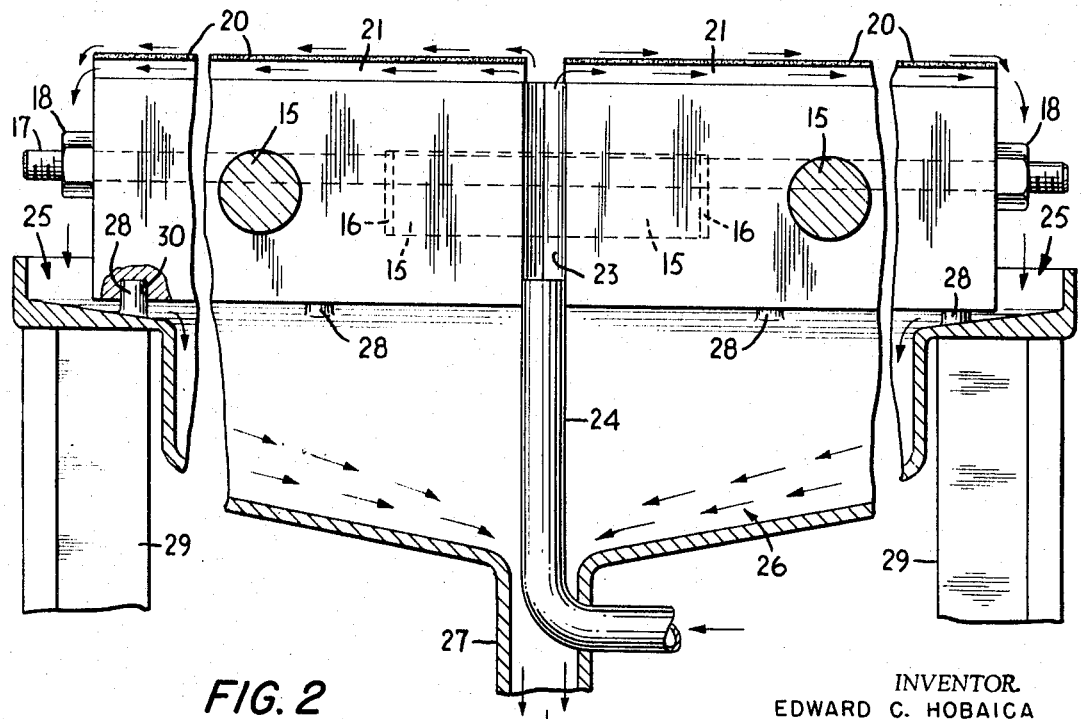

Further objects and advantages of the invention will be apparent from a reading of the following description in conjunction with the accompanying drawing, in which:

FIG. 1 is a plan view illustrating a representative flat bearing arranged according to the invention; and FIG. 2 is an enlarged sectional view partly broken away taken along the line 2—2 of FIG. 1 and looking in the direction of the arrows.

In the typical embodiment of the invention illustrated in the drawings, a flat bearing member 10 is made up of four individual bearing segments 11, 12, 13 and 14. These segments are positioned with their bearing surfaces in coplanar relation by a plurality of dowels 15 which project from the sides of the segments and are received in closely fitting relation in corresponding holes 16 in the sides of the adjacent segments. Four bolts 17 extend through corresponding bores in the bearing segments and carry nuts 18 threaded on their opposite ends so as to retain the four bearing segments in rigidly assembled relation.

Although the representative bearing illustrated in the drawings is made of only four rectangular segments, it will be readily apparent that flat bearings may be made of many more segments and of segments having different shapes according to the invention. In addition, it will be obvious that other arrangements for holding the segments in rigid assembly and for assuring coplanar relationship of their surfaces may be utilized.

In order to provide a bearing surface having an extremely low coefficient of friction, each of the bearing segments is preferably provided with an anti-friction layer 20 consisting of a fabric having fibers made of polytetrafluoroethylene, such as "Teflon," and the fabric may be bonded to the bearing segments in the manner described in my copending application Ser. No. 395,648, filed Sept. 11, 1964, for "Bonding of Teflon Fabric." As described in that application, the use of Teflon fabric results in an excellent anti-friction surface which is capable of withstanding extreme pressures in operation.

Although the Teflon fabric provides an excellent low friction surface, it is, in many instances, desirable to cover the bearing surface with a secondary lubricant such as grease or oil. Accordingly, each of the bearing segments 11–14 has a shallow groove 21 extending along the edge of the bearing surface adjacent to the next segment so that a plurality of channels 22 radiate from the center of the composite bearing toward the outer edges thereof. As best seen in FIG. 2, moreover, a bore 23 passes perpendicularly through the composite bearing at its center and is connected to a lubricant supply line 24 at the bottom of the bearing through which oil may be supplied under high pressure.

Surrounding the bearing assembly 10 is a trough 25 which is positioned to catch oil after it has passed over the bearing surface and through the channels 22 and to convey it to a sump 26 from which the oil is returned to the supply for cleaning and recirculation by a line 27. In the illustrated embodiment, the composite bearing is supported and positioned by a plurality of pegs 28 which extend upwardly through the trough from a support frame 29 and are received in corresponding recesses 30 in the bottom of the bearing.

In operation, the bearing 10 is supported by the pegs 28 from the frames 29 and another flat bearing member (not shown) is disposed in sliding engagement with the coplanar layers 20 of Teflon fabric. Oil pumped through the conduit 24 and the bore 23 floods the surface of the Teflon fabric to provide secondary lubrication. As the two bearing surfaces move with respect to each other, any foreign matter between them is trapped in the channels 22 and oil passing through the channels carries the foreign matter away from the bearing.

In a particular embodiment, the bearing segments 11, 12, 13 and 14 each measured 10 inches by 10 inches thereby being conveniently fabricated and the channels 22 were approximately ⅛ inch wide. Consequently, although each of the segments was easily made, the entire bearing surface area was relatively large. It will be understood, of course, that considerably more than four bearing segments may be assembled to provide a composite bearing member according to the invention and that additional channels 22 may be cut into the surface of each bearing segment, if desired, to increase the number of traps for foreign matter. Moreover, it will be readily apparent that the channels 22 act as traps for foreign matter even if no fluid lubricant is circulated. Air might be used as the circulating fluid in such cases.

Although the invention has been described herein with reference to a specific embodiment, many modifications and variations therein will readily occur to those skilled in the art. Accordingly, all such variations and modifica-

I claim:

1. A composite flat bearing comprising at least two individual bearing segments assembled in abutting relation, each segment having a flat bearing surface covered with a layer of polytetrafluoroethylene, at least one of the bearing surfaces having a groove formed therein along its edge and abutting the adjacent segment, and means for retaining the bearing segments in assembled abutting relationship with their bearing surfaces coplanar.

2. A composite flat bearing comprising at least four flat bearing segments assembled in abutting relation, each segment having a flat bearing surface covered with a layer of polytetrafluoroethylene, each segment being formed with a groove along the edge of the bearing surface and abutting the adjacent segment means for retaining the segments in assembled abutting relation with their bearing surfaces coplanar and with the grooves intersecting at a junction and means forming a passageway leading through the bearing to the junction to permit application of a fluid lubricant to the grooves.

References Cited

UNITED STATES PATENTS

| | | | |
|---|---|---|---|
| 610,000 | 8/1898 | Serve | 308—5 |
| 617,817 | 1/1899 | Smith | 308—38 |
| 680,962 | 8/1901 | Crudginton | 308—3 |
| 1,207,071 | 2/1916 | Parsons | 308—3 |
| 1,903,865 | 4/1933 | Johnson | 308—5 |
| 2,326,426 | 8/1943 | Baker | 308—5 |
| 2,631,068 | 3/1953 | Saul | 308—5 |
| 2,635,930 | 4/1953 | Daugherty | 308—3 |
| 2,711,352 | 6/1955 | Hasko | 308—72 |
| 2,908,506 | 10/1959 | Runton. | |
| 2,923,342 | 2/1960 | Anderson | 308—3 |
| 3,218,108 | 11/1965 | Sazavsky | 308—5 |

FOREIGN PATENTS

| | | |
|---|---|---|
| 591,952 | 2/1954 | Canada. |
| 627,146 | 7/1949 | Great Britain. |

MARTIN P. SCHWADRON, *Primary Examiner.*

L. L. JOHNSON, *Assistant Examiner.*